United States Patent
Arimoto et al.

(10) Patent No.: US 10,181,784 B2
(45) Date of Patent: Jan. 15, 2019

(54) POWER SUPPLY SYSTEM AND IMAGE FORMING APPARATUS

(71) Applicant: BROTHER KOGYO KABUSHIKI KAISHA, Nagoya-shi, Aichi-ken (JP)

(72) Inventors: Hideki Arimoto, Nagoya (JP); Shinya Nakagawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/471,701

(22) Filed: Mar. 28, 2017

(65) Prior Publication Data

US 2018/0095403 A1   Apr. 5, 2018

(30) Foreign Application Priority Data

Sep. 30, 2016   (JP) .................................. 2016-194388

(51) Int. Cl.
  *H02M 1/32*   (2007.01)
  *H02M 3/335*  (2006.01)
  *H02M 1/08*   (2006.01)
  *G03G 15/00*  (2006.01)

(52) U.S. Cl.
  CPC .............. *H02M 1/32* (2013.01); *G03G 15/55* (2013.01); *H02M 1/08* (2013.01); *H02M 3/33507* (2013.01); *G03G 15/80* (2013.01); *H02M 2001/327* (2013.01)

(58) Field of Classification Search
  CPC ...... H02M 1/32; H02M 3/33507; H02M 1/08; H02M 2001/327; G03G 15/80
  See application file for complete search history.

(56) References Cited

U.S. PATENT DOCUMENTS

| 8,503,900 B2* | 8/2013 | Inukai ............... G03G 15/5004 307/130 |
| 2006/0227476 A1* | 10/2006 | Yang ................. H02M 3/33507 361/90 |
| 2007/0139837 A1 | 6/2007 | Usui et al. |

(Continued)

FOREIGN PATENT DOCUMENTS

| JP | 2003-289668 A | 10/2003 |
| JP | 2004-173391 A | 6/2004 |

(Continued)

*Primary Examiner* — Gary L Laxton
*Assistant Examiner* — Rafael O. De Leó Domenech
(74) *Attorney, Agent, or Firm* — Merchant & Gould P.C.

(57) ABSTRACT

A power supply system includes: a switching power supply configured to output a direct current; a control circuit configured to output a switching signal; an abnormality detection circuit configured to output an abnormality signal; an operation control unit connected to the control circuit and the abnormality detection circuit and configured to output an operation control signal, and a power supply control circuit configured to, when a first operation control signal is input, switch a state of the switching power supply to an operation state or a stop state. The operation control unit outputs the first operation control signal to the power supply control circuit when the switching signal is input. The operation control unit outputs a second operation control signal to the power supply control circuit when the abnormality signal is input.

18 Claims, 9 Drawing Sheets

(56) References Cited

U.S. PATENT DOCUMENTS

| | | | | |
|---|---|---|---|---|
| 2010/0315846 | A1* | 12/2010 | Lin .................. | H02M 1/32 |
| | | | | 363/50 |
| 2012/0113685 | A1 | 5/2012 | Inukai | |
| 2014/0210264 | A1* | 7/2014 | Inukai .................. | H02J 9/061 |
| | | | | 307/23 |
| 2016/0036340 | A1 | 2/2016 | Kikuchi et al. | |

FOREIGN PATENT DOCUMENTS

| | | |
|---|---|---|
| JP | 2007-174753 A | 7/2007 |
| JP | 2009-130975 A | 6/2009 |
| JP | 2012-105378 A | 5/2012 |
| JP | 2016-36242 A | 3/2016 |

* cited by examiner

POWER SUPPLY SYSTEM AND IMAGE FORMING APPARATUS

CROSS REFERENCE TO RELATED APPLICATION

This application is based upon and claims the benefit of priority of Japanese Patent Application No. 2016-194388 filed on Sep. 30, 2016, the contents of which are incorporated herein by reference in its entirety.

BACKGROUND

The disclosure relates to a power supply system and an image forming apparatus.

Such a power supply system is known in which a switching signal (control pulse signal) is output by a control device and an oscillation state of a switching power supply is thus switched. Specifically, the switching power supply includes a transformer, a semiconductor switching element connected to a primary coil of the transformer and configured to control energization of the primary coil, and a switch control unit configured to control switching of the semiconductor switching element, and the control device is configured to output the switching signal to the switch control unit.

In the power supply system as disclosed in Patent Document 1, for example, in preparation for an abnormality that abnormal current flows through the switching power supply and abnormal heat generation is thus caused in the transformer, it is preferably to provide an abnormality detection circuit configured to detect the abnormality of the switching power supply. However, in general, when the abnormality detection circuit is provided, a circuit scale of the power supply system increases.

SUMMARY

It is therefore an object of the disclosure to provide a power supply system capable of detecting an abnormality of a switching power supply with a small circuit scale and an image forming apparatus having the power supply system.

According to the above configuration, when the switching signal is input, the operation control unit outputs the first operation control signal, and when the abnormality signal is input, the operation control unit outputs the second operation control signal. Therefore, it is possible to provide the power supply system capable of detecting an abnormality with a small circuit scale.

According to the disclosure, it is possible to provide the power supply system capable of detecting the abnormality of the switching power supply with the small circuit scale and the image forming apparatus having the power supply system.

DESCRIPTION OF ILLUSTRATIVE EMBODIMENTS

First Illustrative Embodiment

<Configuration of Laser Printer>

Figure 1:
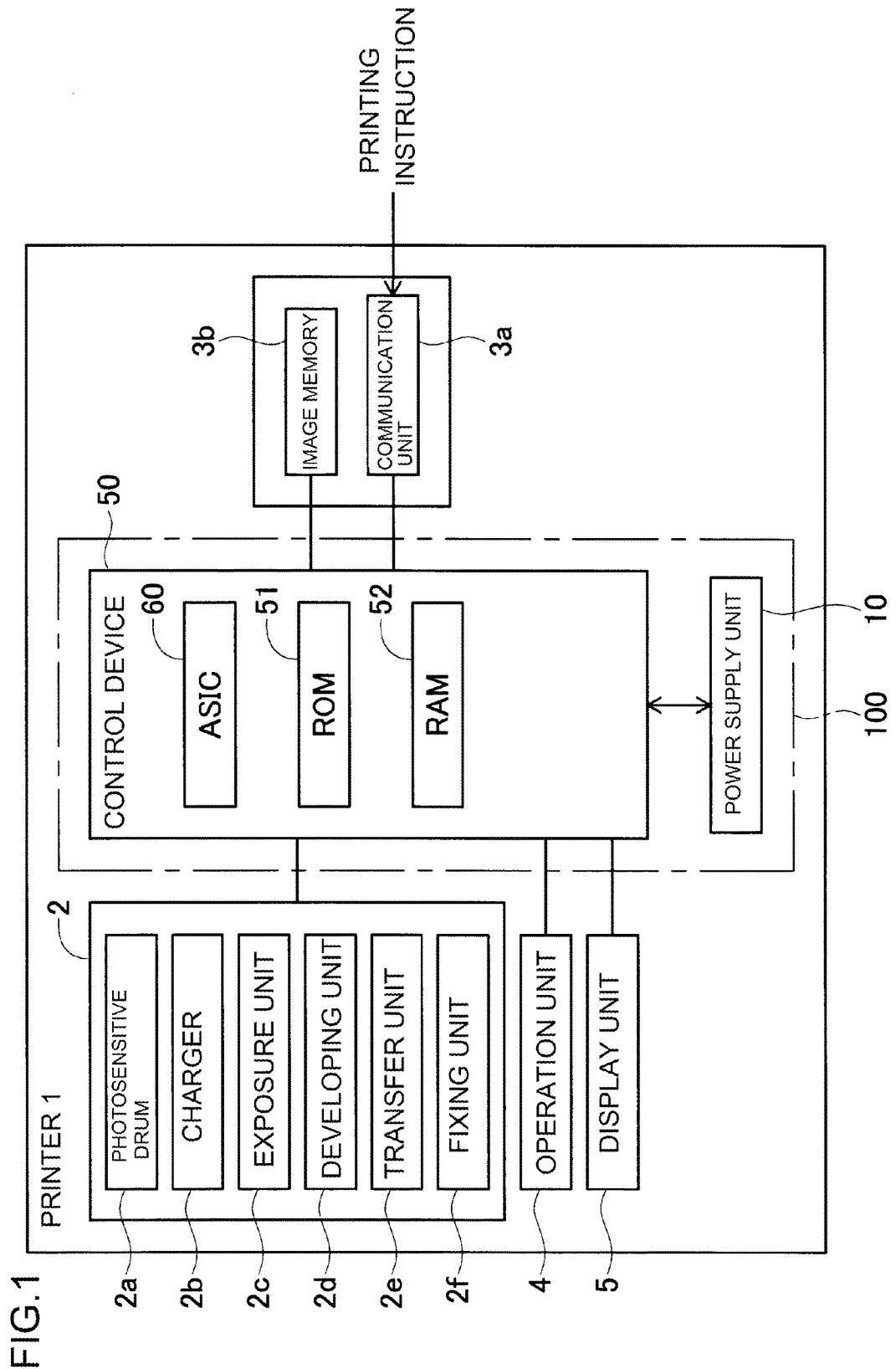
FIG. 1 is a block diagram depicting a schematic configuration of a laser printer in accordance with a first illustrative embodiment of the disclosure.

FIG. 1 is a block diagram depicting a schematic configuration of a laser printer (hereinafter, abbreviated as printer) 1. The printer 1 includes a printing unit 2, a communication unit 3a, an image memory 3b, an operation unit 4, a display unit 5, a power supply system 100 and the like. The power supply system 100 includes a power supply unit 10 and a control device 50. The power supply unit 10 is configured to generate power supply voltages, which are to be supplied to the respective units of the printing unit 2, the communication unit 3a, the image memory 3b, the operation unit 4, the display unit 5, the control device 50 and the like, from an alternating current power supply AC (refer to FIG. 2), and to supply the same to the respective units. In the meantime, an operating voltage of the printing unit 2 is mainly 24V, and operating voltages of the communication unit 3a, the image memory 3b and the control device 50 are mainly 3.3V. Also, the control device 50 is electrically connected with the printing unit 2, the communication unit 3a, the image memory 3b, the operation unit 4, the display unit 5 and the like.

The printing unit 2 includes a photosensitive drum 2a, a charger 2b, an exposure unit 2c, a developing unit 2d, a transfer unit 2e, a fixing unit 2f and the like. The exposure unit 2c is configured to form an electrostatic latent image on a surface of the photosensitive drum 2a charged by the charger 2b. The developing unit 2d is configured to form a toner image by supplying toner to the electrostatic latent image. The transfer unit 2e is configured to transfer the toner image to a sheet. The fixing unit 2f is configured to heat-fix the toner transferred to the sheet on the sheet. In this way, the printing unit 2 is configured to form an image on the sheet.

The communication unit 3a is provided to perform communication with an information terminal apparatus (not shown) such as a PC, and is configured to receive a printing instruction and print data from the information terminal apparatus. The image memory 3b is configured to temporarily store therein the print data received from the information terminal apparatus.

The operation unit 4 includes a plurality of buttons. A user can perform a variety of operations by pushing the buttons. The display unit 5 has a liquid crystal monitor or the like, and can display a setting screen of printing or the like, an operation state of the apparatus and the like on the liquid crystal monitor or the like.

The control device 50 includes an ASIC (application specific IC) 60, a ROM 51, a RAM 52 and the like. In the ROM 51, a program for executing operations of the printing unit 2, and the like are stored. The RAM 52 is used as a main storage device by which the control device 50 is to execute a variety of processing.

When the communication unit 3a receives the printing instruction and the print data from the information terminal apparatus (not shown), the control device 50 controls the printing unit 2 to execute printing processing of forming an image based on the print data on the sheet.

The printer 1 has a normal mode and an OFF mode, as operation modes. The normal mode indicates a state in which the power supply unit 10 operates and the power is fed to the respective units of the printer 1, including the printing unit 2. In the normal mode, the printer 1 can execute the printing processing, in response to the printing instruction. In contrast, the OFF mode indicates a state in which the operation of the power supply unit 10 is stopped and the power is fed to a part of the ASIC 60 by a charging circuit 27 (which will be described later). Like this, in the OFF mode, since the operation of the power supply unit 10 is stopped, the printer 1 less consumes the power than in the normal mode.

<Configuration of Power Supply System>

Figure 2:
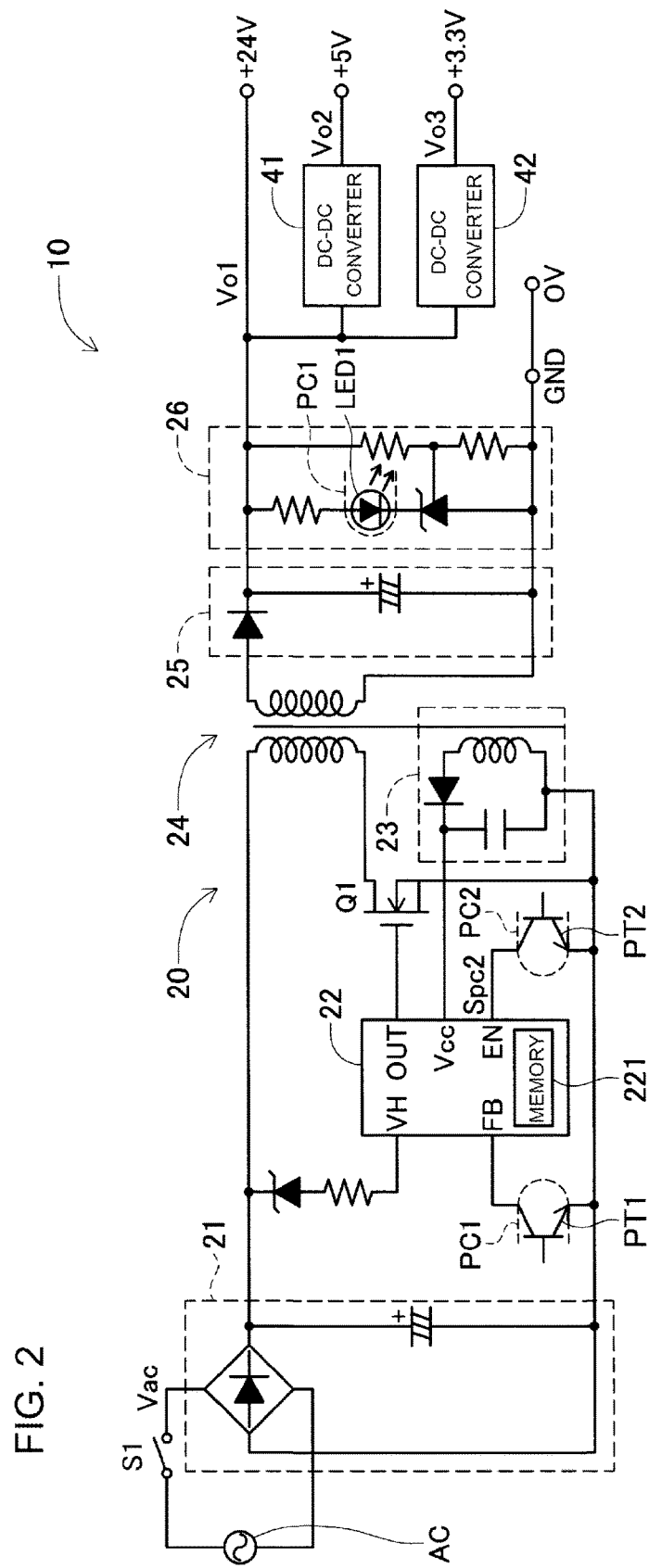
FIG. 2 is a circuit diagram depicting a configuration of a power supply unit of a power supply system in accordance with the first illustrative embodiment.

Subsequently, a configuration of the power supply system 100 of the first illustrative embodiment is described with reference to FIGS. 2 and 3. The power supply system 100 includes a power supply unit 10, a charging circuit 27, a heating abnormality detection circuit 81, an overvoltage abnormality detection circuit 82, an IC control circuit 70, an ASIC 60 and the like. The power supply unit 10 includes a control IC 22, a switching power supply 20, a DC-DC converter 41, a DC-DC converter 42 and the like.

In the normal mode, the power supply unit 10 is configured to output an output voltage Vo1, which is a direct current voltage of +24V (hereinafter, referred to as "DC 24V"), an output voltage Vo2, which is a direct current voltage of +5V (hereinafter, referred to as "DC 5V"), and an output voltage Vo3, which is a direct current voltage of +3.3V (hereinafter, referred to as "DC 3.3V").

The switching power supply 20 includes a switch S1, a rectification smoothing circuit 21, a voltage generation circuit 23, a transformer 24, a transistor Q1, a rectification smoothing circuit 25, a voltage detection circuit 26 and the like.

Figure 4:
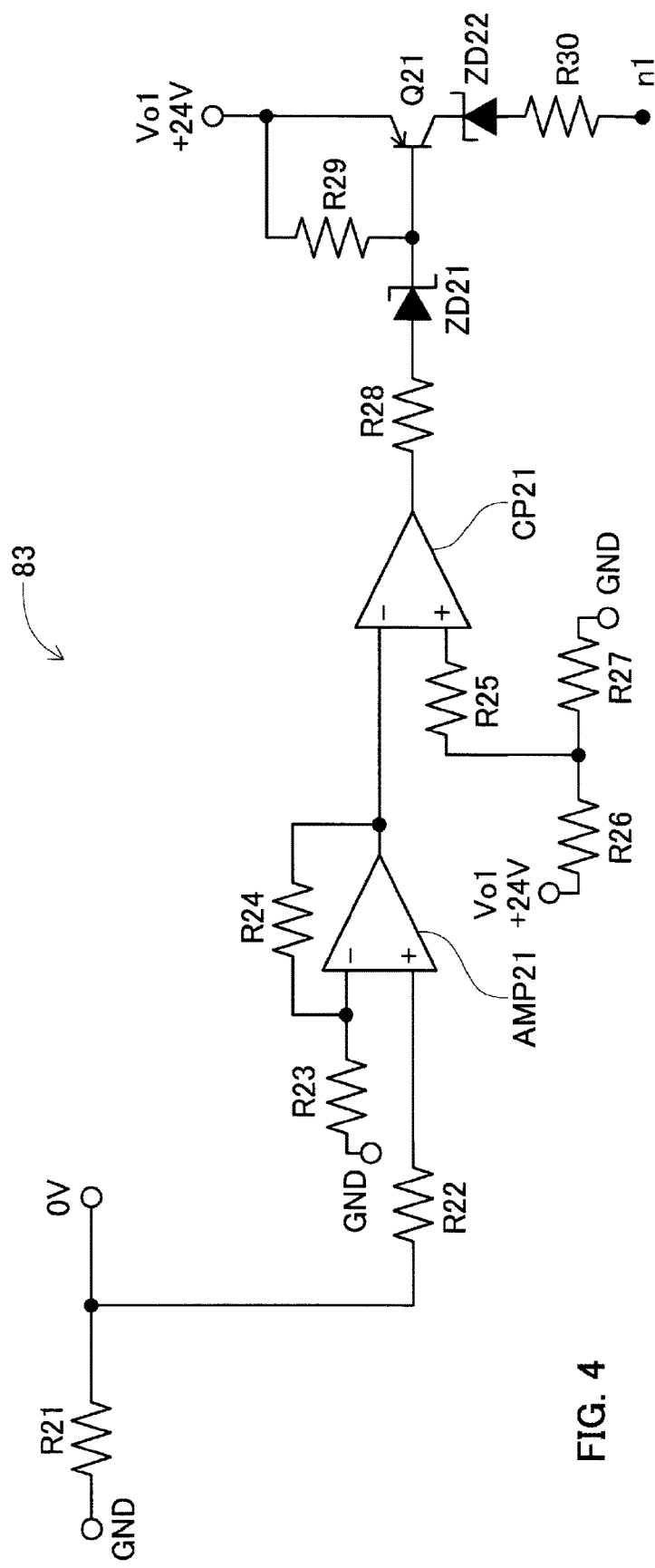
FIG. 4 is a circuit diagram of an abnormality detection circuit in accordance with another illustrative embodiment.

The switching power supply 20 is configured to rectify and smooth an alternating current voltage Vac of the alternating current power supply AC, to generate DC 24V and to output the output voltage Vo1. Also, the DC-DC converter 41 and the DC-DC converter 42 are connected to a rear end of the switching power supply 20. The DC-DC converter 41 is configured to generate DC 5V from DC 24V. The DC-DC converter 42 is configured to generate DC 3.3V from DC 24V. Meanwhile, in the normal mode, the switching power supply 20 is configured to generate a voltage of DC 24V. Therefore, in the normal mode, the DC-DC converter 41 and the DC-DC converter 42 are also configured to generate voltages of DC 5V and DC 3.3V, respectively. In the meantime, a negative-side terminal of a secondary side of the switching power supply 20 is a 0V terminal, and a GND terminal is provided between the 0V terminal and the voltage detection circuit 26. The GND terminal is provided to illustrate another example (FIG. 4) of the abnormality detection circuit. In the meantime, the printing unit 2 is configured to form an image on a sheet by using the direct current voltage that is to be output from the switching power supply 20.

The rectification smoothing circuit 21 is a so-called capacitor input type, and includes a diode bridge configured to rectify the alternating current voltage Vac of the alternating current power supply AC, which is to be fed via the switch S1, and a capacitor configured to smooth the rectified voltage. An output of the rectification smoothing circuit 21 is output to a primary coil of the transformer 24. In the meantime, the switch S1 is a switch by which a user can designate an on or off state of the printer 1.

In the normal mode, a PWM signal that is to be output from a port OUT of the control IC 22 is input to a gate terminal of the transistor Q1, which is an NMOSFET. Thereby, the transistor Q1 repeats on and off operations. Then, the primary side of the transformer 24 oscillates, so that a voltage is induced to the secondary coil of the transformer 24.

Also, the primary side of the transformer 24 is provided with the voltage generation circuit 23. The voltage generation circuit 23 is configured to rectify and smooth a voltage, which is to be induced to an auxiliary coil provided at the primary side of the transformer 24, and to generate a power supply voltage Vcc for the control IC 22.

The rectification smoothing circuit 25 is configured to rectify and smooth the voltage induced to the secondary coil of the transformer 24 and to generate and output DC 24V.

The voltage detection circuit 26 includes a photo-coupler PC1. A light emitting diode LED1 of the photo-coupler PC1 is configured to emit light, in response to the output voltage of the rectification smoothing circuit 25. A photo transistor PT1 of the photo-coupler PC1 configured to receive the light emitted from the light emitting diode LED1 is connected to a port FB of the control IC 22. Thereby, the output voltage of the rectification smoothing circuit 25 is fed back to the control IC 22.

The control IC 22 has ports VH, FB, OUT, Vcc, EN. Also, the control IC 22 has a non-volatile memory 221. The control IC 22 has an output mode and a stop mode, and is configured to change an output from the port OUT, in correspondence to each mode. Specifically, in the output mode, the control IC 22 is configured to output a PWM signal. Thereby, the transformer 24 is driven, the switching power supply 20 is operated, and the output voltages Vo1 to Vo3 are output from the power supply unit 10. On the other hand, in the stop mode, the control IC 22 is configured not to output the PWM signal. Thereby, the operation of the switching power supply 20 is stopped and the output voltages Vo1 to Vo3 are not output from the power supply unit 10. That is, in the normal mode of the printer 1, the control IC 22 is configured to operate in the output mode, and in the OFF mode of the printer 1, the control IC 22 is configured to operate in the stop mode. In the meantime, when an operation control signal Spc2 corresponding to a pulse signal Sr is input to the port EN, the mode of the control IC 22 is switched to the stop mode if it is in the output mode or is switched to the output mode if it is in the stop mode.

The ASIC 60 (FIG. 3) has a main block B1 and a mode control block B2. Also, the ASIC 60 has a port P1 at the main block B1 and ports P2 to P5 at the mode control block B2. While the printer 1 is in the normal mode, the power of the output voltage Vo1 is fed to the main block B1 from the port P1, so that the main block controls the printing unit 2. While the printer 1 is in the normal mode and the OFF mode, the power of an output voltage Vo4 (which will be described later) is fed to the mode control block B2 from the port P2, so that the mode control block operates.

The charging circuit 27 includes a diode D4, a capacitor C4, resistances R3 to R6, a DC-DC converter 43, a comparator CP and the like. The DC-DC converter 43 is configured to generate DC 3.3V from DC 5V and to output an output voltage Vo4, which is DC 3.3V. The diode D4 and the capacitor C4 are connected in series between an output terminal of the DC-DC converter 41 configured to output the output voltage Vo2 and a 0V terminal. A connection point between the diode D4 and the capacitor C4 is connected to an input terminal of the DC-DC converter 43 and a power supply terminal of the comparator CP. The resistances R3, R4 are connected in series between the connection point of the diode D4 and the capacitor C4 and the 0V terminal. A connection point between the resistance R3 and the resistance R4 is connected to a non-inverting terminal of the comparator CP. The resistances R5, R6 are connected in series between an output terminal of the DC-DC converter 43 and the 0V terminal. A connection point between the resistance R5 and the resistance R6 is connected to an inverting terminal of the comparator CP. An output terminal of the comparator CP is connected to the port P5 of the ASIC 60. The output terminal of the DC-DC converter 43 is connected to the port P2 of the ASIC 60.

The charging circuit 27 is configured to keep feeding the power to the ASIC 60 even while the control IC 22 is in the stop mode. While the control IC 22 is in the output mode, the capacitor C4 is charged by the power of the output voltage Vo2. When the control IC 22 is switched to the stop mode, the power is fed from the capacitor C4 to the ASIC 60 via the DC-DC converter 43. Thereby, the ASIC 60 can operate. Also, when a charging voltage Vch1, which is a voltage of the connection point between the diode D4 and the capacitor C4, exceeds a reference voltage, the comparator CP outputs a detection signal of a high level to the port P5, and when the charging voltage Vch1 is lower than the reference voltage, the comparator CP outputs a detection signal of a low level to the port P5.

The IC control circuit 70 includes a switch S2, transistors Q2, Q3, a resistance R7, and a light emitting diode LED2 of a photo-coupler PC2. The transistor Q2, which is a PNP bipolar transistor, the resistance R7 and the light emitting diode LED2 are connected in series between the port P2 of the ASIC 60 and a 0V terminal. An emitter terminal of the transistor Q2 is connected to a line configured to electrically connect the output terminal of the DC-DC converter 43 and the port P2 of the ASIC 60, and a collector terminal of the transistor Q2 is connected to one end of the resistance R7. A base terminal of the transistor Q3, which is an NPN bipolar transistor, is connected to the port P3, an emitter terminal is connected to the 0V terminal, and a collector terminal is connected to a base terminal of the transistor Q2. The switch S2 is connected between the ports P2, P4. The switch S2 is a switch by which a user can switch the normal mode and the OFF mode of the printer 1. Also, the heating abnormality detection circuit 81 and the overvoltage abnormality detection circuit 82 are connected to a connection point n1 between the other end of the resistance R7 and the light emitting diode LED2.

When a pulse signal Sr, which instantaneously becomes a high level, is input from the mode control block B2 to the base terminal of the transistor Q3 via the port P3, the transistors Q3, Q2 become on and the light emitting diode LED2 of the photo-coupler PC2 instantaneously emits light. Then, a photo transistor PT2 (FIG. 2) of the photo-coupler PC2 configured to receive the light emitted from the light emitting diode LED2 instantaneously becomes on, a voltage of the port EN of the control IC 22 is instantaneously changed and an operation control signal Spc2 having a pulse shape is input to the port EN of the control IC 22.

The heating abnormality detection circuit 81 includes a thermistor T1, resistances R8, R9, a Zener diode ZD1, a transistor Q4 and a capacitor C1. The thermistor T1 and the resistance R9 are connected in series between a terminal from which the output voltage Vo1 is to be output and a 0V terminal. A cathode terminal of the Zener diode ZD1 is connected to the terminal from which the output voltage Vo1 is to be output, and an anode terminal is connected to an emitter terminal of the transistor Q4, which is a PNP bipolar transistor. The capacitor C1 is connected between a base terminal and the emitter terminal of the transistor Q4. Also, the base terminal of the transistor Q4 is connected to a connection point between the thermistor T1 and the resistance R9. The resistance R8 is connected between a collector terminal of the transistor Q4 and the connection point n1.

The thermistor T1 is a PTC thermistor, and is arranged in the vicinity of the transformer 24. When the transformer 24 is abnormally heated and a temperature around the thermistor T1 exceeds a predetermined value, a resistance value of the thermistor T1 increases and the transistor Q4 becomes on, so that current flows from the terminal from which the output voltage Vo1 is to be output towards the connection point n1 and an abnormality signal So1 of a high level is output. Thereby, the light emitting diode LED2 of the photo-coupler PC2 emits the light, and the operation control signal Spc2 of a high level is input to the port EN of the control IC 22.

The overvoltage abnormality detection circuit 82 includes a resistance R10, a Zener diode ZD2 and a diode D1, which are connected in series between a terminal from which the output voltage Vo1 is to be output and the connection point n1. When the output voltage Vo1 exceeds the predetermined value, the current flows from the output voltage Vo1 towards the connection point n1 and an abnormality signal So1 of a high level is output. Thereby, the light emitting diode LED2 of the photo-coupler PC2 emits the light, and the operation control signal Spc2 of a high level is input to the port EN of the control IC 22.

In the meantime, a path in which a line of the output voltage Vo4 and a line of the output voltage Vo1 are connected is formed by the IC control circuit 70, the heating abnormality detection circuit 81 and the overvoltage abnormality detection circuit 82. However, the current is prevented from flowing back from the connection point n1 to the output voltage Vo4 by the transistor Q2 and from the connection point n1 to the output voltage Vo1 by the transistor Q4 and the diode D1.

As described above, when the abnormality of the switching power supply 20 such as the overheating of the transformer 24, the overvoltage of the output voltage Vo1 or the like is detected, the heating abnormality detection circuit 81 and the overvoltage abnormality detection circuit 82 output the abnormality signals So1 of the high level. However, transition times for which the abnormality signals So1 shift from the low level to the high level are different. Since the abnormality signal So1, which is to be output from the heating abnormality detection circuit 81, depends on a heat capacity of the transformer 24, the transition time from the low level to the high level is longer, as compared to the abnormality signal So1 that is to be output from the overvoltage abnormality detection circuit 82. Likewise, the transition time from the high level to the low level of the abnormality signal So1 is longer in the abnormality signal So1 that is to be output from the heating abnormality detection circuit 81, as compared to the abnormality signal So1 that is to be output from the overvoltage abnormality detection circuit 82.

<Operations of Power Supply System>

In the normal mode of the printer 1, when the printing processing is not executed for a predetermined time period in the printing unit 2 or when the switch S2 is operated by a user, for example, the ASIC 60 outputs the pulse signal Sr from the port P3 in order to switch the printer 1 to the OFF mode, i.e., to switch the control IC 22 to the stop mode. Also, in the OFF mode of the printer 1, when the output signal from the comparator CP, which is to be input to the port P5, becomes a low level, or when the switch S2 is operated by a user, for example, the ASIC 60 outputs the pulse signal Sr in order to switch the printer 1 to the normal mode, i.e., to switch the control IC 22 to the output mode. In the meantime, the reason to switch the printer 1 to the normal mode when the output signal from the comparator CP becomes a low level is described. In this case, if the control IC 22 is not immediately switched to the output mode, the charges enough to feed the power for enabling the light emitting diode LED2 to emit the light are not secured in the capacitor C4, so that it is not possible to switch the control IC to the output mode. As the ASIC 60 outputs the pulse signal Sr, the control IC 22 is immediately switched to the output mode, so that the printer 1 returns to the normal mode. Thereby, the power supply unit 10 can charge the capacitor C4. Although the main block B1 of the ASIC 60 is not fed with the power of the output voltage Vo3 while the control IC 22 is in the stop mode, the mode control block B2 can operate by the power fed from the output voltage Vo4. Thereby, the ASIC 60 can output the pulse signal Sr even while the control IC 22 is in the stop mode.

Pulse widths of the pulse signal Sr are different when instructing the switching from the output mode to the stop mode and when instructing the switching from the stop mode to the output mode. Specifically, the pulse width of the pulse signal Sr for instructing the switching to the stop mode is greater than the pulse width of the pulse signal Sr for instructing the switching to the output mode. Therefore, the control IC 22 can determine on the basis of the pulse width of the operation control signal Spc2 whether the operation control signal is an instruction for switching to the stop mode or the output mode. When the abnormality signal So1 is output from the heating abnormality detection circuit 81 or the overvoltage abnormality detection circuit 82, the operation control signal Spc2 of the high level is input to the port EN of the control IC 22. Herein, the abnormality signal So1 is a signal that is to be a high level for a time period in which the heating abnormality detection circuit 81 or the overvoltage abnormality detection circuit 82 detects an abnormality of the power supply unit 10. Therefore, when it is determined that the time period of the high level of the operation control signal Spc2 is longer than a predetermined time period, the control IC 22 determines that the operation control signal Spc2 is a signal based on the abnormality signal So1. Herein, the predetermined time period is a time period equivalent to the pulse width of the pulse signal Sr for instructing the switching to the stop mode. Also, the abnormality signal So1 that is to be output from the heating abnormality detection circuit 81 and the abnormality signal So1 that is to be output from the overvoltage abnormality detection circuit 82 have different level transition times. For this reason, based on the level transition time of the operation control signal Spc2, the control IC 22 can determine that the operation control signal is a signal based on the abnormality signal So1 output from the heating abnormality detection circuit 81 when the transition time is long, and determine that the operation control signal is a signal based on the abnormality signal So1 output from the overvoltage abnormality detection circuit 82 when the transition time is short.

In the meantime, it may be preferably to inhibit the operation of the switching power supply 20, considering the user safety, depending on a type of the abnormality of the switching power supply 20. Herein, since it is assumed that the transformer 24 is out of order, regarding the abnormality of the switching power supply 20 that is to be detected by the heating abnormality detection circuit 81, it is assumed that the control IC 22 inhibits the operation of the power supply unit 10. In the meantime, it is assumed that the abnormality of the switching power supply 20, which is to be detected by the overvoltage abnormality detection circuit 82, is a temporary increase in voltage and the control IC 22 does not inhibit the operation of the switching power supply 20.

Subsequently, the operations of the control IC 22 are described in detail. The control IC 22 detects a voltage of the port EN every predetermined time. When it is determined that the voltage of the port EN is a voltage higher than a low level, i.e., when it is determined that the operation control signal Spc2 has been input, the control IC 22 measures the transition time from the determination timing to time at which the voltage of the port EN becomes a high level.

When the transition time is longer than the predetermined time, since the control IC 22 can determine that the operation control signal Spc2 is based on the abnormality signal So1 output from the heating abnormality detection circuit 81, the control IC 22 is in the stop mode. Also, the control IC 22 records an activation inhibition flag into the memory 221. In the meantime, when the switch S1 becomes on, the control IC 22 determines whether the activation inhibition flag has been recorded in the memory 221. When it is determined that the activation inhibition flag has been recorded, the control IC 22 does not output a PWM signal from the port OUT and is not in the output mode. Thereby, it is possible to inhibit the return to the operation state where the output voltages Vo1 to Vo3 are to be output in the switching power supply 20.

On the other hand, when the transition time is shorter than the predetermined time, the control IC measures duration time of the high level. When the time period from the timing at which the voltage of the port EN becomes the high level to the time at which the voltage is not the high level is equivalent to the pulse width of the pulse signal Sr for instructing the switching to the output mode, since the control IC 22 can determine that the operation control signal Spc2 is a signal based on the pulse signal Sr for instructing the switching to the output mode, the control IC 22 is in the output mode. On the other hand, when the voltage of the port EN is still the high level even though the time equivalent to the pulse width of the pulse signal Sr for instructing the switching to the output mode has elapsed from the timing at which the voltage of the port EN becomes the high level, the control IC 22 is in the stop mode. Meanwhile, in this case, when the pulse signal Sr for instructing the switching to the stop mode may be output from the ASIC 60 and the abnormality signal So1 may be output from the overvoltage abnormality detection circuit 82. Since the pulse width of the pulse signal Sr for instructing the switching to the stop mode is greater than the pulse width of the pulse signal Sr for instructing the switching to the output mode, when the duration time of the high level is longer than the time equivalent to the pulse width of the pulse signal Sr for instructing the switching to the output mode, it is preferably to stop the operation of the switching power supply 20, irrespective of whether the operation control signal Spc2 is based on the abnormality signal So1 or the pulse signal Sr for instructing the switching to the stop mode. Therefore, the control IC 22 is in the stop mode.

Herein, the printer 1 is an example of the image forming apparatus. The printing unit 2 is an example of the image forming unit. The normal mode is an example of the operation state, and the OFF mode is an example of the stop state. Also, the ASIC 60 is an example of the control circuit, the heating abnormality detection circuit 81 and the overvoltage abnormality detection circuit 82 are examples of the abnormality detection circuit, the IC control circuit 70 is an example of the operation control unit, and the control IC 22 is an example of the power supply control circuit. Also, the pulse signal Sr is an example of the switching signal, the abnormality signal So1 is an example of the abnormality signal, the operation control signal Spc2 based on the pulse signal Sr is an example of the operation control signal and the first operation control signal, and the operation control signal Spc2 based on the abnormality signal So1 is an example of the operation control signal and the second operation control signal. Also, the output voltage Vo1 is an example of the direct current voltage. Also, the transistor Q4 is an example of the switching element.

According to the first illustrative embodiment, it is possible to achieve following effects.

It is possible to provide the power supply system 100 capable of detecting the abnormality of the switching power supply 20 with a small circuit scale. For example, in the configuration where the switching power supply 20 has the heating abnormality detection circuit 81, it is considered to transmit the abnormality signal So1 of the heating abnormality detection circuit 81 to the control IC 22 along a path different from the pulse signal Sr from the ASIC 60. In this case, for example, a photo-coupler for transmitting the abnormality signal So1 of the heating abnormality detection circuit 81 to the control IC 22 and a port of the control IC 22 configured to receive an input of the operation control signal Spc2 from the photo-coupler are required separately from a photo-coupler for transmitting the pulse signal Sr from the ASIC 60 to the control IC 22 and a port of the control IC 22 configured to receive an input of the operation control signal Spc2 from the photo-coupler. On the other hand, in the first illustrative embodiment, the IC control circuit 70 is configured to transmit the pulse signal Sr and the abnormality signal So1 to the control IC by the photo-coupler PC2, as the operation control signal Spc2, and to input the operation control signal Spc2 to the port EN of the control IC 22. Thereby, it is possible to provide the power supply system 100 capable of detecting the abnormality of the switching power supply 20 with the small circuit scale.

Also, the abnormality signal So1 is a signal that is to be the high level for the time period in which the heating abnormality detection circuit 81 or the overvoltage abnormality detection circuit 82 detects the abnormality of the power supply unit 10. In the meantime, the pulse signal Sr is a signal having a predetermined pulse width. Since the abnormality signal So1 and the pulse signal Sr have the different time periods of the high level, the control IC 22 can switch the operation mode by determining on the basis of a waveform of the operation control signal Spc2 to be input whether the operation control signal Spc2 is based on the abnormality signal So1 or the pulse signal Sr.

Also, the heating abnormality detection circuit 81 and the overvoltage abnormality detection circuit 82 are configured to generate the abnormality signal So1 from the output voltage Vo1 generated by the switching power supply 20. Thereby, it is possible to detect the abnormality of the switching power supply 20. Also, when the operation of the switching power supply 20 stops, since the operation control signal Spc2 of the high level corresponding to the abnormality signal So1 shifts to the low level, the control IC 22 can determine that the operation of the switching power supply 20 has stopped.

Also, the pulse signal Sr is used as the pulse signal. Thus, as compared to a signal for instructing the switching by using voltages of two values, for example, when the switching to the output mode is instructed, the pulse signal is set to the high level, and when the switching to the stop mode is instructed, the pulse signal is set to the low level, the time period of the high level is more limited, so that the power can be saved. Also, the abnormality signal So1 is a signal that is to be the low level for the time period in which the heating abnormality detection circuit 81 or the overvoltage abnormality detection circuit 82 does not detect the abnormality of the power supply unit 10 and that is to be the high level for the time period in which the heating abnormality detection circuit 81 or the overvoltage abnormality detection circuit 82 detects the abnormality. Thereby, for the time period in which the abnormality signal So1 is output, since the voltage of the connection point n1 becomes the high level, irrespective of whether the pulse signal Sr is input, the IC control circuit 70 and the photo-coupler PC2 can output the operation control signal Spc2 in which the abnormality signal So1 takes priority to the pulse signal Sr. Also, when the time period of the high level of the operation control signal Spc2 continues longer than the pulse width of the pulse signal Sr, the control IC 22 can determine that the abnormality of the power supply unit 10 continues.

Also, the abnormality signal So1 that is to be output from the heating abnormality detection circuit 81 and the abnormality signal So1 that is to be output from the overvoltage abnormality detection circuit 82 have different transition times of the low level and the high level. That is the abnormality signal So1 that is to be output from the heating abnormality detection circuit 81 having the thermistor T1 has the longer transition time. Thereby, the control IC 22 can determine on the basis of the transition time of the operation control signal Spc2 from which of the heating abnormality detection circuit 81 and the overvoltage abnormality detection circuit 82 the abnormality signal So1 is being output. When it is determined that the operation control signal Spc2 based on the abnormality signal So1 output from the heating abnormality detection circuit 81 has been input, the control IC 22 records the activation inhibition flag into the memory 221 and does not perform the operation in the output mode. Thereby, for example, when it is not safe to operate the switching power supply 20, even though the once interrupted power feeding of the alternating current power supply AC to the switching power supply 20 is resumed, it is possible to inhibit the switching power supply 20 from generating the direct current voltage.

[Other Examples of Abnormality Detection Circuit]

In the first illustrative embodiment, as an example of the abnormality detection circuit, the heating abnormality detection circuit 81 and the overvoltage abnormality detection circuit 82 have been described. However, as the abnormality detection circuit, an overcurrent abnormality detection circuit 83 shown in FIG. 4 may also be used. The overcurrent abnormality detection circuit 83 includes resistances R21 to R30, an amplifier AMP21, a comparator CP21, Zener diodes ZD21, ZD22 and a transistor Q21. The resistance R21 is connected between a 0V terminal and the GND terminal (FIG. 2) and is configured to detect current flowing between the 0V terminal and the GND terminal, as a voltage. The resistance R22 is connected between a non-inverting terminal of the amplifier AMP21 and the 0V terminal. The resistance R23 is connected between an inverting terminal of the amplifier AMP21 and the GND terminal, and the resistance R24 is connected between the inverting terminal and an output terminal of the amplifier AMP21. The output terminal of the amplifier AMP21 is connected to an inverting terminal of the comparator CP21. The resistances R26, R27 are connected in series between a terminal from which the output voltage Vo1 is to be output and the GND terminal, and a connection point between the resistance R26 and the resistance R27 is connected to a non-inverting terminal of the comparator CP21 via the resistance R25. An output terminal of the comparator CP21 is connected to an anode terminal of the Zener diode ZD21 via the resistance R28. An emitter terminal of the transistor Q21, which is a PNP bipolar transistor, is connected to the output voltage Vo1, a base terminal is connected to a cathode terminal of the Zener diode ZD21 and a collector terminal is connected to a cathode terminal of the Zener diode ZD22. The resistance R29 is connected between the terminal from which the output voltage Vo1 is to be output and the base terminal of the transistor Q21. An anode terminal of the Zener diode ZD22 is connected to the connection point n1 (FIG. 3) via the resistance R30.

The amplifier AMP21 is configured to output a voltage corresponding to a difference between a voltage corresponding to a current value flowing through the GND terminal and to be input to the non-inverting terminal thereof and a voltage of the GND terminal. The comparator CP21 outputs a signal of a low level when the output voltage of the amplifier AMP21 is higher than a reference voltage to be input to the non-inverting terminal thereof, and outputs a signal of a high level when the output voltage is lower than the reference voltage to be input to the non-inverting terminal. When the current value flowing through the GND terminal is higher than a predetermined value, a signal of a low level is output from the comparator CP21, the current flows through the Zener diode ZD21, the transistor Q21 becomes on, the current flows from the output voltage Vo1 to the connection point n1, and an abnormality signal of a high level is output. Thereby, the light emitting diode LED2 of the photo-coupler PC2 emits the light, and the operation control signal Spc2 of a high level is input to the port EN of the control IC 22. In the meantime, the current is prevented from flowing back from the connection point n1 to the output voltage Vo1 by the transistor Q21.

Figure 3:
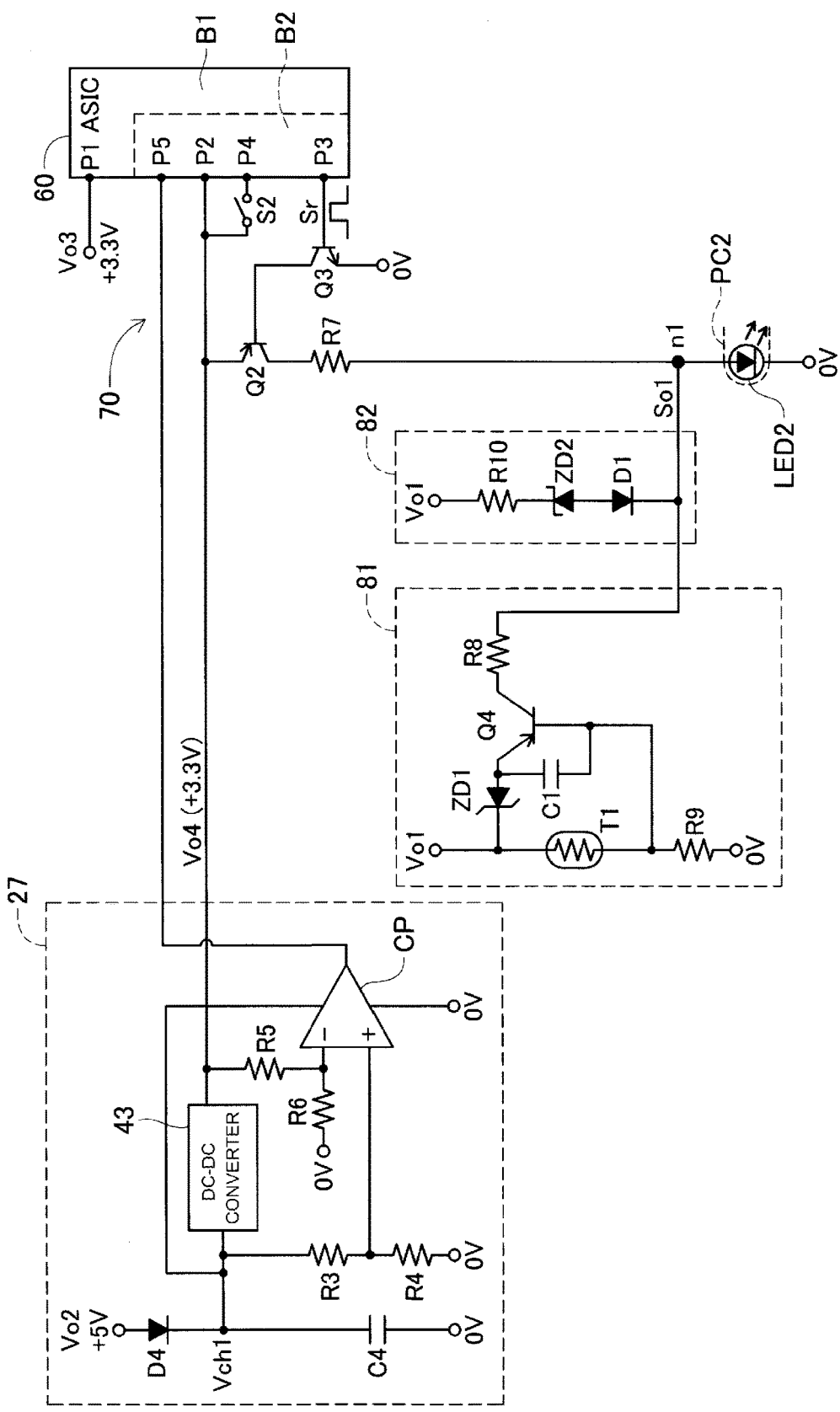
FIG. 3 is a block diagram depicting a configuration of a control device of the power supply system in accordance with the first illustrative embodiment.

In the meantime, when the power supply system includes the overcurrent abnormality detection circuit 83, the overcurrent abnormality detection circuit 83 may be provided in addition to the heating abnormality detection circuit 81 and the overvoltage abnormality detection circuit 82 shown in FIG. 3. Also, the power supply system may include at least one of the heating abnormality detection circuit 81, the overvoltage abnormality detection circuit 82 and the overcurrent abnormality detection circuit 83 without being limited to the configuration of the first illustrative embodiment.

[Other Examples of Overvoltage Abnormality Detection Circuit]

Figure 5:
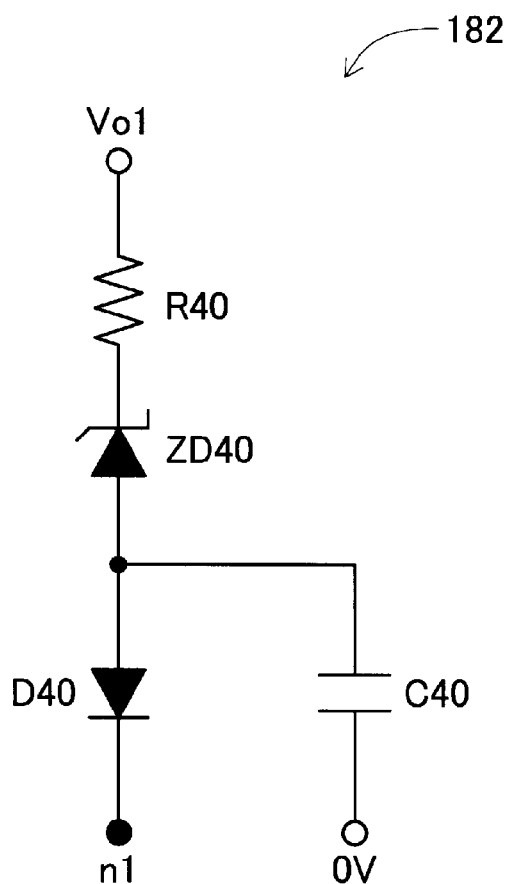
FIG. 5 is a circuit diagram of an abnormality detection circuit including a capacitor in accordance with another illustrative embodiment.

In the first illustrative embodiment, the transition time until the abnormality signal So1 becomes the high level is different between the heating abnormality detection circuit 81 and the overvoltage abnormality detection circuit 82, and the control IC 22 is configured to determine whether the operation control signal Spc2 is based on the abnormality signal So1 output from the heating abnormality detection circuit 81 or the overvoltage abnormality detection circuit 82, on the basis of the configuration where the transition times until the operation control signal Spc2 becomes the high level are different. Also, the transition time of the abnormality signal So1 that is to be output from the overvoltage abnormality detection circuit 82 is shorter than the transition time of the abnormality signal So1 that is to be output from the heating abnormality detection circuit 81. According to a configuration of an overvoltage abnormality detection circuit 182 shown in FIG. 5, which is another example of the overvoltage abnormality detection circuit 82, it is possible to prolong the transition time of the abnormality signal So1. The overvoltage abnormality detection circuit 182 has a configuration where a resistance R40, a Zener diode ZD40 and a diode D40 are connected in series between the terminal from which the output voltage Vo1 is to be output and the connection point n1 and a capacitor C40 is connected between a connection point of the Zener diode ZD40 and the diode D40 and a 0V terminal. By the capacitor C40, the abnormality signal So1 that is to be output as the output voltage Vo1 exceeds the predetermined value is delayed. This configuration is effective. The reason is described. In the configuration where the power supply system 100 has the three abnormality detection circuits, as described above, when the three abnormality detection circuits are configured by the heating abnormality detection circuit 81, the overvoltage abnormality detection circuit 182 and the overcurrent abnormality detection circuit 83 and a capacitance value of the capacitor C40 is set so that the transition time of the abnormality signal So1 to be output from the overvoltage abnormality detection circuit 182 is between the transition time of the abnormality signal So1 to be output from the heating abnormality detection circuit 81 and the transition time of the abnormality signal So1 to be output from the overcurrent abnormality detection circuit 83, the control IC 22 can determine the three abnormality detection circuits by the transition time. Also, the configuration is effective because when the power supply system 100 has the overvoltage abnormality detection circuit 182 and the overcurrent abnormality detection circuit 83, the control IC 22 can determine both the detection circuits. In the meantime, the configuration of adding the capacitor because of the delay of the transition time can also be applied to the overcurrent abnormality detection circuit 83. For example, the capacitor may be connected between the connection point of the Zener diode ZD40 and the diode D40 and the 0V terminal.

Second Illustrative Embodiment

In the first illustrative embodiment, as the example of inhibiting the return from the stop state where the outputs of the output voltages Vo1 to Vo3 of the switching power supply 20 are stopped to the operation state where the output voltages Vo1 to Vo3 are to be output, the configuration of recording the activation inhibition flag in the memory 221 has been described. In the second illustrative embodiment, another configuration of inhibiting the return to the operation state is described.

Figure 6:
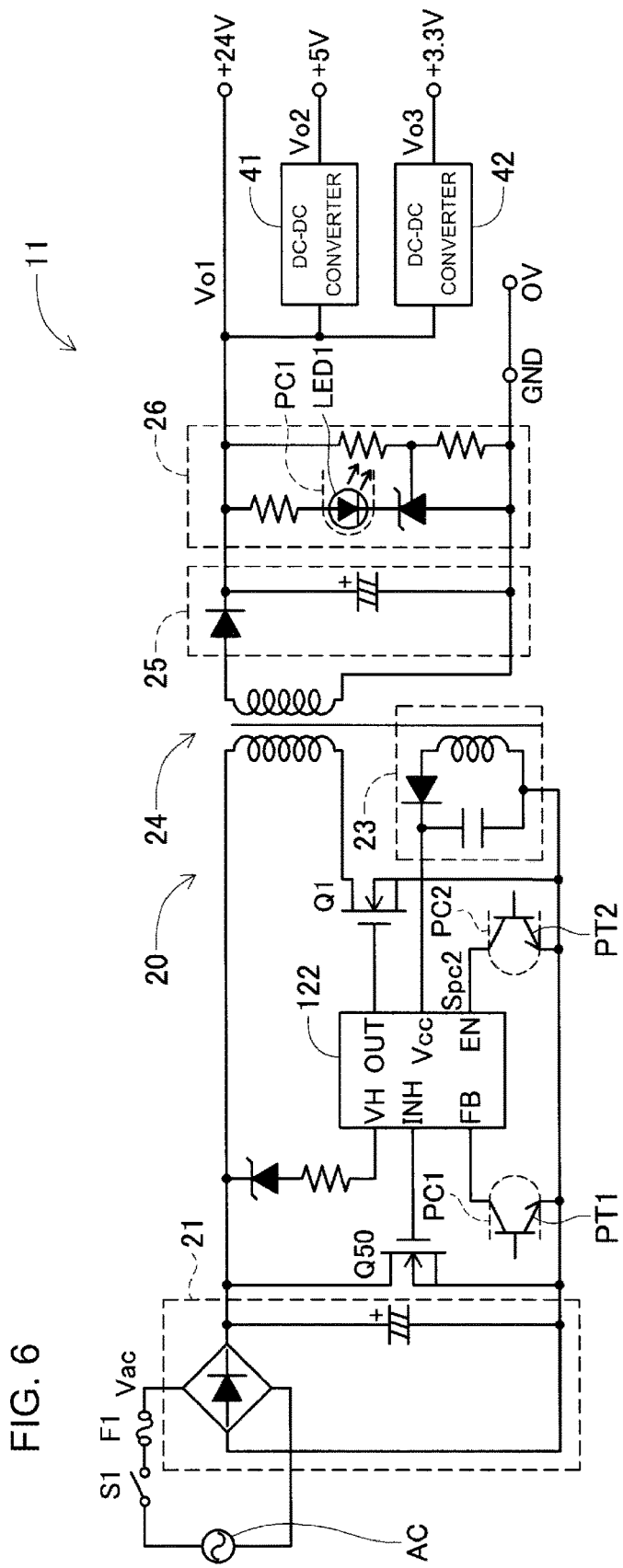
FIG. 6 is a circuit diagram depicting a configuration of a power supply unit of a power supply system in accordance with a second illustrative embodiment.

As shown in FIG. 6, a power supply unit 11 of the second illustrative embodiment has a fuse F1 and a transistor Q50, in addition to the configuration of the power supply unit 10 (FIG. 2), and also has a control IC 122, instead of the control IC 22. The control IC 122 has a port INH, in addition to the configuration of the control IC 22. The fuse F1 is connected between the switch S1 and an AC input terminal of the diode bridge of the rectification smoothing circuit 21. A drain terminal of the transistor Q50, which is an NMOSFET, is connected to the output terminal of the rectification smoothing circuit 21, a source terminal is connected to the negative-side terminal of the diode bridge, and a gate terminal is connected to the port INH of the control IC 122. Since the other configurations are the same as the first illustrative embodiment, the descriptions thereof are omitted.

Like the first illustrative embodiment, when the transition time until the operation control signal Spc2 to be input to the port EN becomes a high level is longer than the predetermined time, since the operation control signal Spc2 is based on the abnormality signal So1 output from the heating abnormality detection circuit 81, the control IC 122 is switched to the stop mode. Also, the control IC 122 outputs a signal of a high level from the port INH, thereby turning on the transistor Q50. Thereby, the large current flows and the fuse F1 is thus fused, so that the power feeding of the alternating current power supply AC to the power supply unit 11 is cut and the return of the switching power supply 20 to the operation state is inhibited. Thereby, like the first illustrative embodiment, when it is not safe to operate the switching power supply 20, for example, it is possible to inhibit the switching power supply 20 from generating the direct current voltage.

Herein, the control IC 122 is an example of the power supply control circuit.

Third Illustrative Embodiment

<Configuration of Power Supply System>

Figure 7:
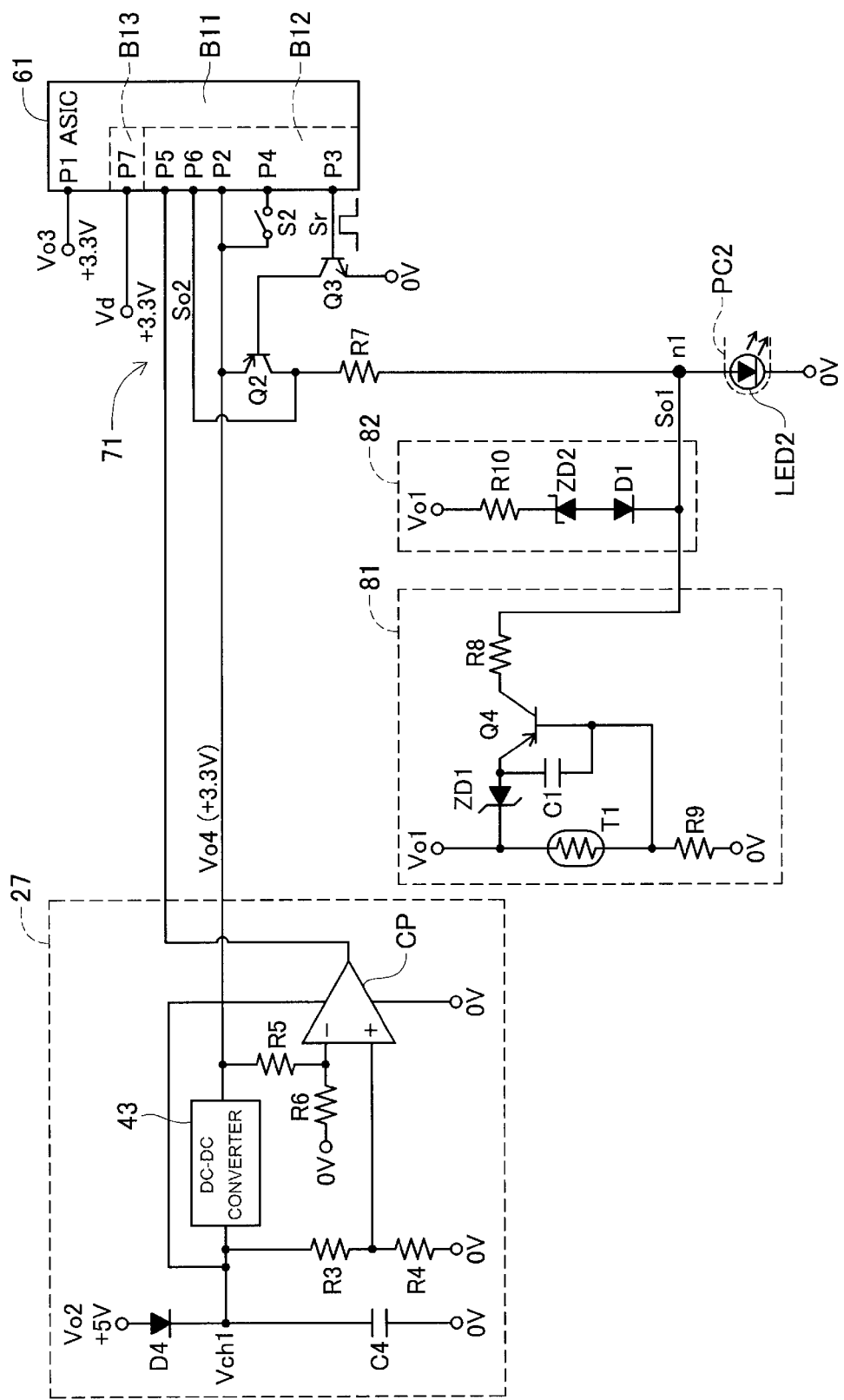
FIG. 7 is a block diagram depicting a configuration of a control device of a power supply system in accordance with a third illustrative embodiment.

Subsequently, a power supply system of a third illustrative embodiment is described with reference to FIG. 7. The power supply system of the third illustrative embodiment has an IC control circuit 71, instead of the IC control circuit 70 of the first illustrative embodiment, and also has an ASIC 61, instead of the ASIC 60 of the first illustrative embodiment. Also, the power supply system of the third illustrative embodiment has a power supply unit configured to output an output voltage Vd of DC 3.3V and having the same configuration as the power supply unit 10, separately from the power supply unit 10 of the first illustrative embodiment. The other configurations, which are the same as the first illustrative embodiment, are denoted with the same reference numerals and the descriptions thereof are appropriately omitted.

The ASIC 61 has a main block B11, a mode control block B12, and a notification block B13. Also, the ASIC 61 has a port P1 at the main block B11, ports P2 to P6 at the mode control block B12 and a port P7 at the notification block B13. While the printer 1 is in the normal mode, the power of the output voltage Vo3 is fed to the main block B11 from the port P1, so that the main block B11 controls the printing unit 2. While the printer 1 is in the normal mode and the OFF mode, the power of the output voltage Vo4 is fed to the mode control block B12 from the port P2, so that the mode control block B12 operates. The power of the output voltage Vd is fed to the notification block B13 from the port P7, so that the notification block B13 controls the display unit 5.

The IC control circuit 71 has a connection line configured to interconnect the connection point of the collector terminal of the transistor Q2 and the resistance R7 and the port P6 of the ASIC 61, in addition to the configuration of the IC control circuit 70 of the first illustrative embodiment. Thereby, as the connection point n1 shifts to the high level, a signal So2 is input to the ASIC 61 from the port P6. When the pulse signal Sr is not output from the port P3 and the signal So2 is input, the ASIC 61 determines that the abnormality signal So1 is being output. Also, based on the transition time until the signal So2 becomes a high level, the ASIC 61 determines whether the abnormality signal So1 is being output from the heating abnormality detection circuit 81 or the overvoltage abnormality detection circuit 82.

<Operations of Power Supply System>

Figure 8:
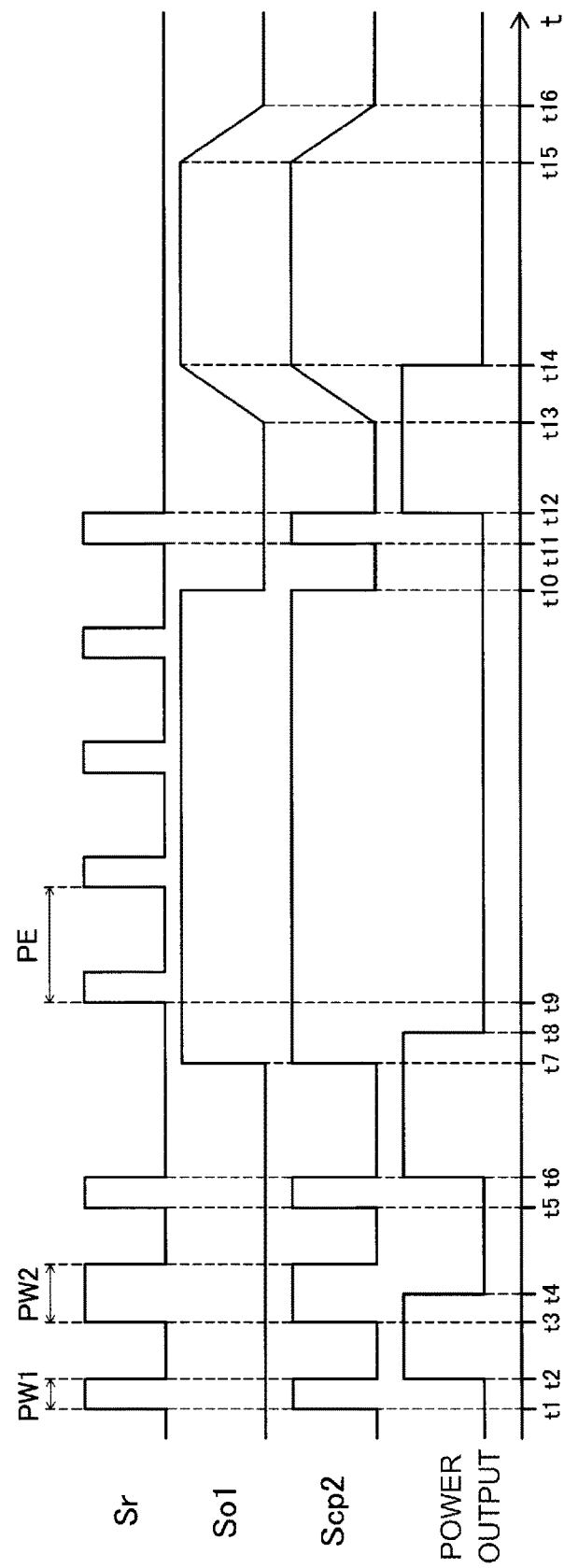
FIG. 8 is a timing chart illustrating operations of the power supply system in accordance with the third illustrative embodiment.

Subsequently, operations of the power supply system of the third illustrative embodiment are described with reference to FIG. 8. In FIG. 8, "Sr" indicates the pulse signal Sr that is to be output from the port P3 by the ASIC 61, "So1" indicates the abnormality signal So1 that is to be output from the heating abnormality detection circuit 81 or the overvoltage abnormality detection circuit 82, and "Spc2" indicates the operation control signal Spc2 that is to be input to the port EN of the control IC 22. Also, "power output" indicates a time period for which the output voltages Vo1 to Vo3 are output from the power supply unit 10, as the high level, and a time period for which the output voltages Vo1 to Vo3 are not output from the power supply unit 10, as the low level. The pulse width of the pulse signal Sr for instructing the switching from the stop mode to the output mode is a pulse width PW1. The pulse width of the pulse signal Sr for instructing the output mode to the stop mode is a pulse width PW2 wider than the pulse width PW1.

At time t1, when the ASIC 61 starts to output the pulse signal Sr for instructing the switching from the stop mode to the output mode, the operation control signal Spc2 is input to the control IC 22. When the transition time from time t1 to time at which the voltage of the port EN shifts from the low level to the high level is shorter than a predetermined time and a time period from time t1 to time t2 at which the voltage of the port EN shifts from the high level to the low level is equivalent to the pulse width PW1, the control IC 22 determines that the operation control signal Spc2 is based on the pulse signal Sr for instructing the switching to the output mode and starts to output the PWM signal from the port OUT. Thereby, the switching power supply 20 operates and the output voltages Vo1 to Vo3 are output from the power supply unit 10. In the meantime, the predetermined time indicates the transition time until the abnormality signal So1 to be output from the heating abnormality detection circuit 81 becomes the high level. Then, at time t3, when the ASIC 61 starts to output the pulse signal Sr for instructing the switching from the output mode to the stop mode, the operation control signal Spc2 is input to the control IC 22. Since the transition time from time t3 to time at which the voltage of the port EN shifts from the low level to the high level is shorter than the predetermined time and the voltage of the port EN is still the high level even at time t4 after the time equivalent to the pulse width PW1 has elapsed from time t3, the control IC 22 determines that the operation control signal Spc2 is not based on the pulse signal Sr for instructing the switching to the output mode, and stops the output of the PWM signal from the port OUT. Thereby, the operation of the switching power supply 20 stops and the outputs of the output voltages Vo1 to Vo3 from the power supply unit 10 are stopped. Likewise, at time t5, when the pulse signal Sr for instructing the switching to the output mode is output from the ASIC 61, the output voltages Vo1 to Vo3 are output from the power supply unit 10 at time t6 after the time equivalent to the pulse width PW1 has elapsed from time t5.

Then, at time t7, it is assumed that the output of the abnormality signal So1 from the overvoltage abnormality detection circuit 82 starts. When the output of the abnormality signal So1 from the overvoltage abnormality detection circuit 82 starts, the input of the operation control signal Spc2 to the control IC 22 starts. When it is confirmed that the transition time from time t7 at which the voltage of the port EN starts to shift from the low level to the high level to time at which the voltage of the port EN completes shifting from the low level to the high level is shorter than the predetermined time and the voltage of the port EN is still the high level at time t8 after the time equivalent to the pulse width PW1 has elapsed from time t7, the control IC 22 determines that the operation control signal Spc2 is not the signal for instructing the switching to the output mode, and stops the output of the PWM signal from the port OUT. Then, at time t9 after the time equivalent to the pulse width PW2 has elapsed from time t7, when it is confirmed that the voltage of the port EN is still the high level, the control IC 22 determines that the abnormality signal So1 is being output from the overvoltage abnormality detection circuit 82 because the time period of the high level is longer than the pulse width PW2, and does not record the activation inhibition flag in the memory 221.

Also, the signal So2, which is a signal having the same waveform as the operation control signal Spc2, is input to the port P6 of the ASIC 61. Since the input of the signal So2 starts even though the pulse signal Sr is not output at time t7, the ASIC 61 determines that the abnormality signal So1 is being output. Also, since the transition time for which the signal So2 shifts from the low level to the high level is shorter than a predetermined time, the ASIC determines that the abnormality signal So1 is being output from the overvoltage abnormality detection circuit 82, and since it is not necessary to inhibit the operation of the switching power supply 20, the ASIC repeatedly outputs the pulse signal Sr indicative of the switching to the output mode with a period PE from time t9. Herein, the predetermined time indicates the transition time until the abnormality signal So1 to be output from the heating abnormality detection circuit 81 becomes the high level. In the meantime, since the abnormality signal So1 is being output from the overvoltage abnormality detection circuit 82, the pulse signal Sr indicative of the switching to the output mode is masked to the abnormality signal So1, and the operation control signal Spc2 becomes a signal of a high level based on the abnormality signal So1 from the overvoltage abnormality detection circuit 82, irrespective of the output of the pulse signal Sr indicative of the switching to the output mode.

Then, at time t10, it is assumed that the output voltage Vo1 is below a predetermined value and the output of the abnormality signal So1 from the overvoltage abnormality detection circuit 82 is over. Thereby, at time t11, the operation control signal Spc2 based on the pulse signal Sr is input to the control IC 22, and at time t12, the power supply unit 10 starts to output the output voltages Vo1 to Vo3.

Then, at time t13, it is assumed that the output of the abnormality signal So1 from the heating abnormality detection circuit 81 starts. When the voltage of the port EN increases from the low level and becomes the high level at time t14, the control IC 22 determines that the operation control signal Spc2 is based on the abnormality signal So1 output from the heating abnormality detection circuit 81 because the transition time from time t13 to time t14 is equal to or longer than the predetermined time, and stops the output of the PWM signal from the port OUT. Also, the control IC 22 records the activation inhibition flag in the memory 221. Since the transition time of the signal So2 from time t13 to time t14 is equal to or longer than the predetermined time, the ASIC 61 determines that the abnormality signal So1 is being output from the heating abnormality detection circuit 81 and does not output the pulse signal Sr thereafter. Thereby, after time t15, t16 at which the output of the abnormality signal So1 stops, the power supply unit 10 is kept at the stop state.

Also, as the mode control block B12 determines that the abnormality signal So1 is being output from the overvoltage abnormality detection circuit 82, the notification block B13 of the ASIC 61 outputs a control signal for notification to the display unit 5 and displays an error message on the liquid crystal monitor, thereby notifying that it is not possible to execute the printing processing due to the abnormality of the switching power supply 20, for example. Also, when the mode control block B12 determines that the abnormality signal So1 is being output from the heating abnormality detection circuit 81, the notification block B13 of the ASIC 61 notifies that the switching power supply 20 is stopped due to the failure and is thus required to be repaired, for example, in the same manner.

Herein, the ASIC 61 is an example of the control circuit and the control signal for notification is an example of the notification signal.

According to the third illustrative embodiment, it is possible to achieve following effects.

When the heating abnormality detection circuit 81 or the overvoltage abnormality detection circuit 82 outputs the abnormality signal So1, the signal So2 is input to the port P6. Therefore, the ASIC 61 can determine that the switching power supply 20 is abnormal. Also, when it is determined that there is the abnormality, the ASIC 61 outputs the control signal to the display unit 5 to execute the notification by the display. Thereby, the user can recognize that the abnormality has occurred in the printer 1.

Also, when it is determined that the abnormality signal So1 is a signal output from the overvoltage abnormality detection circuit 82, by which it is not necessary to inhibit the operation of the power supply unit 10, the ASIC 61 outputs the pulse signal Sr indicative of the switching to the output mode with the period PE. Thereby, it is possible to resume the operation of the switching power supply 20, in response to the stop of the output of the abnormality signal So1 from the overvoltage abnormality detection circuit 82.

Fourth Illustrative Embodiment

Figure 9:
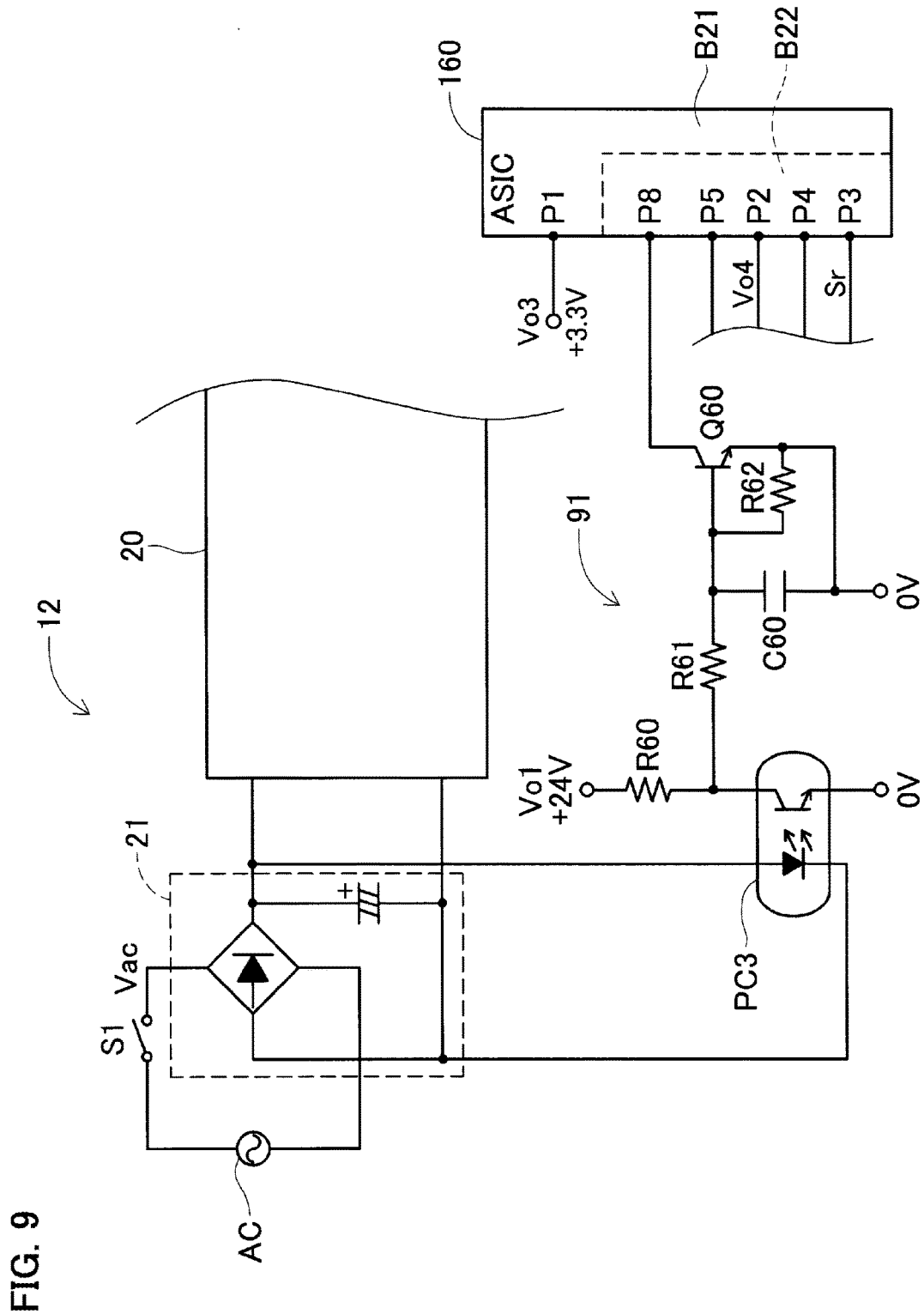
FIG. 9 is a block diagram depicting a configuration of a power supply system in accordance with a fourth illustrative embodiment.

Subsequently, a power supply system of a fourth illustrative embodiment is described with reference to FIG. 9. The power supply system of the fourth illustrative embodiment has an ASIC 160, instead of the ASIC 60 of the first illustrative embodiment. Also, a power supply unit 12 of the fourth illustrative embodiment has a monitoring circuit 91, in addition to the configuration of the power supply unit 10 of the first illustrative embodiment. The ASIC 160 includes a main block B21 and a mode control block B22, and has a port P1 at the main block B21 and ports P2 to P5, P8 at the mode control block B22. The main block B21 and the mode control block B22 have the same functions as the main block B1 and the mode control block B2 of the first illustrative embodiment, respectively. The other configurations, which are the same as the first illustrative embodiment, are denoted with the same reference numerals and the descriptions thereof are appropriately omitted. Meanwhile, in FIG. 9, the control IC 22, the DC converters 41, 42, the charging circuit 27, the heating abnormality detection circuit 81, the overvoltage abnormality detection circuit 82 and the IC control circuit 70 are not shown.

The monitoring circuit 91 is configured to monitor whether the alternating current voltage Vac of the alternating current power supply AC is being input to the power supply unit 12. The monitoring circuit 91 includes a photo-coupler PC3, resistances R60 to R62, a capacitor C60 and a transistor Q60. A light emitting diode of the photo-coupler PC3 is connected between the positive-side terminal and the negative-side terminal of the diode bridge of the rectification smoothing circuit 21. The resistance R60 and a photo transistor of the photo-coupler PC3 are connected in series between the terminal from which the output voltage Vo1 is to be output and a 0V terminal. A connection point between the resistance R60 and the photo transistor of the photo-coupler PC3 is connected to a base terminal of the transistor Q60, which is an NPN bipolar transistor, via the resistance R61. A collector terminal of the transistor Q60 is connected to the port P7 of the ASIC 160, and an emitter terminal is connected to the 0V terminal. The resistance R62 and the capacitor C60 are connected between the base terminal and the emitter terminal of the transistor Q60.

When the alternating current voltage Vac is input to the power supply unit 12, the light emitting diode and the photo transistor of the photo-coupler PC3 become on, the transistor Q60 becomes off and a voltage of the port P8 does not vary. When the input of the alternating current voltage Vac to the power supply unit 12 is cut, the light emitting diode and the photo transistor of the photo-coupler PC3 become off, and the transistor Q60 becomes on and the voltage of the port P7 varies for a time period until the voltage of the output voltage Vo1 is lowered.

While the control IC 22 is in the output mode, the mode control block B22 of the ASIC 160 detects voltage values of the ports P8, P2 every predetermined time. When the voltage value of the output voltage Vo4 input to the port P2 becomes lower than a predetermined value even though the voltage of the port P8 does not vary and the pulse signal Sr is not output from the port P3, the ASIC 160 starts to output the pulse signal Sr indicative of the switching to the output mode with the period PE, like the third illustrative embodiment. This case relates to a situation where even though the alternating current voltage Vac is being input to the power supply unit 12, the voltage of the output voltage Vo4 is lowered and a problem has occurred in the switching power supply 20. Therefore, the ASIC 160 outputs the pulse signal Sr indicative of the switching to the output mode. When the pulse signal Sr indicative of the switching to the output mode is input, the control IC 22 (refer to FIG. 2) of the switching power supply 20 restarts. Thereby, even when a problem has occurred in the switching power supply 20, it is possible to restart the control IC 22.

Herein, the ASIC 160 is an example of the control circuit.

According to the fourth illustrative embodiment, it is possible to achieve following effects.

When the voltage value of the output voltage Vo4 to be input to the port P2 becomes lower than the predetermined value even though the voltage of the port P8 does not vary and the pulse signal Sr is not output from the port P3, the ASIC 160 outputs the pulse signal Sr indicative of the switching to the output mode. The situation that the voltage of the port P8 does not vary indicates that there is the input of the alternating current voltage Vac to the switching power supply 20. The situation where the voltage value of the output voltage Vo4 to be input to the port P2 becomes lower than the predetermined value even though the pulse signal Sr is not output from the port P3 indicates that the voltage value of the output voltage Vo4 is lowered without being caused by the pulse signal Sr. In this case, the ASIC 160 repeatedly outputs the pulse signal Sr indicative of the switching to the output mode. Thereby, when a problem has occurred in the switching power supply 20, it is possible to restart the switching power supply 20.

In the meantime, the disclosure is not limited to the above illustrative embodiments, and a variety of improvements and changes can be made without departing from the gist of the disclosure.

[Other Examples of Switching Signal]

In the first illustrative embodiment, as an example of the switching signal, the pulse signal Sr having the pulse width, which is different when instructing the switching to the stop mode and when instructing the switching to the output mode, is used. The waveform of the switching signal is not limited thereto. For example, the switching signal may be a pulse signal having a pulse width, which is the same when instructing the switching to the stop mode and when instructing the switching to the output mode. In this case, the control IC 22 may be configured to switch the mode between the stop mode and the output mode in a toggle manner whenever a pulse signal based on the switching signal is input from the port EN. Alternatively, the switching signal may be a pulse signal of which the number of pulses having a pulse width, which is the same when instructing the switching to the stop mode and when instructing the switching to the output mode, is different. For example, when instructing the switching to the stop mode, the number of pluses at a predetermined time is set to one (1) and when instructing the switching to the output mode, the number of pluses at the predetermined time is set to two (2). In this case, when a pulse signal based on the switching signal is input from the port EN, the control IC 22 may switch the mode between the stop mode and the output mode, in correspondence to the number of pluses. Also in the case of the switching signal having the above waveform, since the switching signal has the pulse width different from the abnormality signal, the control IC 22 can determine whether the pulse signal to be input to the port EN is based on the switching signal or the abnormality signal. Also, the above example of the switching signal can be applied to the fourth illustrative embodiment, too.

Also, in the three forms of the switching signals, including the first illustrative embodiment, the number of pluses is preferably set to two or more. In the above, since the abnormality signal So1 is a signal that becomes the high level for the time period in which the heating abnormality detection circuit 81 and the like detect the abnormality, the pulse signal Sr and the abnormality signal So1 are distinguished by the comparison of the time period in which the operation control signal Spc2 of the high level is continuously input. However, when the time period in which the heating abnormality detection circuit 81 and the like detect the abnormality is short, the pulse width of the abnormality signal So1 is substantially the same as the pulse width of the pulse signal Sr and may not be distinguished by the time period in which the operation control signal Spc2 of the high level is continuously input. Therefore, when the number of pluses of the pulse signal Sr is set to two or more, the control IC 22 can securely distinguish whether the operation control signal Spc2 to be input corresponds to the abnormality signal So1 or the pulse signal Sr. Specifically, regarding the pulse signal Sr of the first illustrative embodiment, the number of pluses is preferably set to two or the like, for example, when instructing the switching to the stop mode and when instructing the switching to the output mode. Also in the configuration where the mode is switched in the toggle manner, the number of pluses is preferably set to two or the like, for example. Also, in the configuration where the number of pulses having a pulse width, which is the same when instructing the switching to the stop mode and when instructing the switching to the output mode, is different, the number of pluses at the predetermined time is set to two (2) when instructing the switching to the stop mode and is set to four (4) when instructing the switching to the output mode, for example. According to this configuration, the abnormality signal So1 is a signal that becomes the high level for a time period in which the heating abnormality detection circuit or the overvoltage abnormality detection circuit detects the abnormality of the power supply unit. In the meantime, the pulse signal Sr is a signal having the predetermined number of pluses. Since the number of pluses for the predetermined time period is different between the abnormality signal So1 and the pulse signal Sr, the control IC 22 can determine whether the operation control signal Spc2 is based on the abnormality signal So1 or the pulse signal Sr, based on the waveform of the operation control signal Spc2 that is to be input to the control IC 22, and can change the operation mode. Also, according to this configuration, when the number of pluses of the operation control signal Spc2, which is to be input to the port EN, is not plural at the predetermined time, the control IC 22 can determine that the operation control signal Spc2 is a signal corresponding to the abnormality signal So1. Even when a signal corresponding to the abnormality signal So1 having a narrow pulse width is input, it is possible to securely shift the control IC 22 to the stop mode.

Also, in the first illustrative embodiment, when the abnormality signal So1 is output from the overvoltage abnormality detection circuit 82, the operation of the switching power supply 20 is not inhibited. However, the disclosure is not limited thereto. That is, the operation of the switching power supply 20 may be inhibited.

Also, in the third illustrative embodiment, the notification is made on the liquid crystal monitor of the display unit 5. However, the disclosure is not limited thereto. For example, a sound display by an alarm or the like, a lamp notification or the like may also be used. Alternatively, for example, the control device 50 may have a non-volatile storage unit and an error log in which an abnormality has occurred may be left in a log stored in the storage unit.

Also, the pulse signal Sr, the abnormality signal So1 and the operation control signal Spc2 may be configured as signals of which logics are opposite to the above examples. As shown in FIG. 8, the waveforms of the pulse signal Sr, the abnormality signal So1 and the operation control signal Spc2 become the high levels for the time periods in which the pulse signal Sr, the abnormality signal So1 and the operation control signal Spc2 are to be output. However, the disclosure is not limited thereto. For example, the pulse signal Sr, the abnormality signal So1 and the operation control signal Spc2 may be configured as signals having waveforms that become the high level for the time periods in which the pulse signal Sr, the abnormality signal So1 and the operation control signal Spc2 are not to be output and become the low level for the time periods in which the pulse signal Sr, the abnormality signal So1 and the operation control signal Spc2 are to be output.

Also, for example, in the first illustrative embodiment, the control device 50 has the ASIC 60. However, the disclosure is not limited thereto. For example, the control device may have a CPU, in place of the ASIC, or may be configured by a combination of the CPU and the ASIC.

Also, for example, in the first illustrative embodiment, the power supply system 100 is applied to the laser printer.

However, the disclosure is not limited thereto. For example, the power supply system 100 can also be applied to a printer such as an inkjet printer, a complex machine having scanner, copy and facsimile functions, and the like.

What is claimed is:

1. A power supply system comprising:
   a switching power supply configured to output a direct current voltage by a switching operation;
   a control circuit configured to output a switching signal that is a pulse signal of two values, the switching signal being a pulse signal having a different pulse width for each mode out of an output mode where the switching power supply outputs the direct current voltage and a stop mode where the switching power supply stops outputting the direct current voltage;
   an abnormality detection circuit configured to output an abnormality signal corresponding to an abnormality of the switching power supply, the abnormality signal being a signal of two values and having one value out of the two values in a case where the abnormality signal indicates an abnormality or the other value out of the two values in a case where the abnormality signal indicates no abnormality;
   an output circuit configured to be connected to the control circuit and the abnormality detection circuit,
      wherein the abnormality detection circuit and the control circuit are connected to a single terminal,
      the single terminal is connected to the output circuit,
      the switching signal output from the control circuit and the abnormality signal output from the abnormality detection circuit are input to the output circuit through the single terminal,
      in a case where the abnormality signal has the one value of the two values, the switching signal is masked by the abnormality signal at the single terminal, the abnormality signal is input to the output circuit, and the output circuit outputs an operation control signal having a waveform corresponding to the abnormality signal, and
      in a case where the abnormality signal has the other value of the two values, the switching signal is input to the output circuit, and the output circuit outputs an operation control signal having a waveform corresponding to the switching signal; and
   a power supply control circuit configured to control the switching operation of the switching power supply, configured to, when the operation control signal input from the output circuit is a pulse signal, switch a mode to one of the output mode and the stop mode, and configured to, when the operation control signal input from the output circuit has the one value of the two values that is input longer than the pulse width of the switching signal, control the switching power supply to stop outputting the direct current voltage.

2. The power supply system according to claim 1, wherein the abnormality detection circuit is configured to generate the abnormality signal by using the direct current voltage.

3. The power supply system according to claim 1, wherein the abnormality signal is a signal that is a low level at a normal situation and is a high level at an abnormal situation.

4. The power supply system according to claim 3, wherein the switching signal has a plurality of number of pluses.

5. The power supply system according to claim 3 further comprising a plurality of the abnormality detection circuits each configured to output the abnormality signal, according to each of a plurality of types of abnormalities, wherein the plurality of abnormality signals output from the respective abnormality detection circuits are different as to at least one of transition time in which the abnormality signal shifts from the low level to the high level and transition time in which the abnormality signal shifts from the high level to the low level.

6. The power supply system according to claim 5, wherein one of the plurality of abnormality detection circuits comprises:
   a thermistor to which the direct current voltage is to be input and of which a resistance value changes according to a temperature of a target, and
   a switching element to which a divided voltage divided by the thermistor is input and configured to be turned on in response to a voltage value of the divided voltage which changes in response to a change in the resistance value of the thermistor, to output the abnormality signal.

7. The power supply system according to claim 5, wherein one of the plurality of abnormality detection circuits comprises:
   an output element to which the direct current voltage is input and configured to be turned on in response to output power of the switching power supply, to output the abnormality signal, and
   a capacitor connected to an output terminal of the output element and configured to delay the abnormality signal.

8. The power supply system according to claim 5, wherein the power supply control circuit is configured to inhibit return from a state where the switching power supply stops outputting the direct current voltage to a state where the switching power supply outputs the direct current voltage in response to the transition time.

9. The power supply system according to claim 1, wherein the control circuit is configured to monitor an output of the abnormality detection circuit and determine that the switching power supply is abnormal when the abnormality signal is output.

10. The power supply system according to claim 9, wherein the control circuit outputs a notification signal when it is determined that the switching power supply is abnormal.

11. The power supply system according to claim 1, wherein the control circuit is configured to monitor an output of the abnormality detection circuit and repeatedly output the switching signal for instructing switching from the stop mode to the output mode when the abnormality signal is output.

12. The power supply system according to claim 1, further comprising a monitoring circuit configured to monitor whether AC power is input to the switching power supply,
   wherein the control circuit is configured to monitor a voltage value of the direct current voltage, and repeatedly output the switching signal for instructing switching from the stop mode to the output mode when the monitoring circuit determines that the AC power is input and the voltage value of the direct current voltage is lowered without being caused by the switching signal.

13. The power supply system according to claim 1, wherein
   the abnormality detection circuit includes a heating abnormality detection circuit and an overvoltage abnormality detection circuit,
   the output circuit includes a photo-coupler including a light emitting diode, and
   an output terminal of the heating abnormality detection circuit and an output terminal of the overvoltage abnormality detection circuit are connected to an anode terminal of the light emitting diode.

14. The power supply system according to claim 13, wherein
   the output circuit is the photo-coupler,
   the output terminal of the overvoltage abnormality detection circuit and the output terminal of the heating abnormality detection circuit are connected at a connection point that is connected to the single terminal,
   the abnormality signal output from the overvoltage abnormality detection circuit is input to the output circuit through the connection point and the single terminal, and
   the abnormality signal output from the heating abnormality detection circuit is input to the output circuit through the connection point and the single terminal.

15. The power supply system according to claim 1, wherein
   the output mode indicates a state in which the power supply system operates and the power is fed to an image forming apparatus, and the stop mode indicates a state in which the operation of the power supply system is stopped and the power is fed to the control circuit.

16. The power supply system according to claim 1, wherein
   the control circuit is driven by an energy providing unit different from the switching power supply in the stop mode of a state where the operation of the switching power supply is stopped.

17. The power supply system according to claim 16, wherein
   the energy providing unit is a storing element configured to store energy from the switching power supply when the switching power supply is in the output mode.

18. An image forming apparatus comprising:
   a power supply system comprising:
   a switching power supply configured to output a direct current voltage by a switching operation;
   a control circuit configured to output a switching signal that is a pulse signal of two values, the switching signal being a pulse signal having a different pulse width for each mode out of an output mode where the switching power supply outputs the direct current voltage and a stop mode where the switching power supply stops outputting the direct current voltage;
   an abnormality detection circuit configured to output an abnormality signal corresponding to an abnormality of the switching power supply, the abnormality signal being a signal of two values and having one value out of the two values in a case where the abnormality signal indicates an abnormality or the other value out of the two values in a case where the abnormality signal indicates no abnormality;
   an output circuit configured to be connected to the control circuit and the abnormality detection circuit,
      wherein the abnormality detection circuit and the control circuit are connected to a single terminal,
      the single terminal is connected to the output circuit,
      the switching signal output from the control circuit and the abnormality signal output from the abnormality detection circuit are input to the output circuit through the single terminal,
      in a case where the abnormality signal has the one value of the two values, the switching signal is masked by the abnormality signal at the single terminal, the abnormality signal is input to the output circuit, and the output circuit outputs an operation control signal having a waveform corresponding to the abnormality signal, and in a case where the abnormality signal has the other value of the two values, the switching signal is input to the output circuit, and the output circuit outputs an operation control signal having a waveform corresponding to the switching signal; and a power supply control circuit configured to control the switching operation of the switching power supply, configured to, when the operation control signal input from the output is a pulse signal, switch a mode to one of the output mode and the stop mode, and configured to, when the operation control signal input from output circuit has the one value of the two values that is input longer than the pulse width of the switching signal, control the switching power supply to stop outputting the direct current voltage; and an image forming unit configured to form an image by using the direct current voltage.

* * * * *